United States Patent

Chaklader

[15] 3,666,851
[45] May 30, 1972

[54] PREPARING HIGH DENSITY MAGNESIA REFRACTORIES

[72] Inventor: Asoke C. D. Chaklader, Vancouver, British Columbia, Canada

[73] Assignee: Canadian Patents and Development Limited, Ottawa, Ontario, Canada

[22] Filed: Nov. 10, 1969

[21] Appl. No.: 875,567

[52] U.S. Cl. ................................264/66, 264/125, 264/332, 75/206, 75/211, 75/226
[51] Int. Cl. ..................................................C04b 35/64
[58] Field of Search .................... 75/206, 211, 226; 264/332, 264/66, 125

[56] References Cited

UNITED STATES PATENTS

| | | | |
|---|---|---|---|
| 3,379,523 | 4/1968 | Chaklader | 75/206 |
| 3,348,957 | 10/1967 | Chaklader et al | 264/332 |
| 2,823,134 | 2/1958 | Atlas | 106/58 |

*Primary Examiner*—Carl D. Quarforth
*Assistant Examiner*—B. H. Hunt
*Attorney*—Lawrence I. Field

[57] ABSTRACT

A method of preparing high density refractories of magnesia by one of (a) partially calcining magnesium carbonate and/or magnesium hydroxide, and hot pressing the partially calcined raw materials while dehydroxylation and/or decarbonation is occurring; (b) calcining magnesium carbonate and/or magnesium hydroxide, partially hydrating (or rehydrating) the calcined raw materials and hot-pressing while the dehydroxylation is occurring; or (c) mixing sinterable magnesia and/or partially hydrated material from (b) with the hydroxide or carbonate and not pressing while decomposition is occurring: followed in each case by a short stabilizing heat treatment at sintering temperatures.

15 Claims, No Drawings

PREPARING HIGH DENSITY MAGNESIA REFRACTORIES

The development of the large tonnage production of high quality steel needs improved quality refractories and especially basic refractories. Because of the high melting temperature of MgO, refractories based on magnesia have drawn considerable attention from the refractories manufacturer to improve the quality of the basic refractory products, by admixture with other oxides such as $Cr_2O_3$ and by changing the production method. Although the basic principles in the production method remained the same over the last 50 years, proper grain size control, improved dead-burning procedure, improved drying and firing method, and finally, quality-control of the raw materials and the final products helped in producing superior quality refractories currently available.

Although small objects such as burner nozzles, crucibles etc. are commercially available, large sized materials such as refractory bricks suitable for steel-plant use having a density over 90 percent of theoretical have not been commercially produced economically. It is true that the available technology can be used to produce such a refractory (over 90 percent dense) but economic considerations have hindered commercializing the product.

A process will now be described which can more economically produce very high density magnesia refractories. This process is an improvement on the principle described in my U.S. Pat. No. 3,379,523 dated Apr. 23, 1968. Essentially this patented process involves hot pressing a decomposible compound such as $Mg(OH)_2$ or $Mg CO_3$ (either synthetic or natural), during the decomposition reaction to oxide.

Before this new process is described, it would be proper to discuss the conventional commercial process, as this will aid in distinguishing the economic advantages of this new process.

The raw materials generally used for the production of magnesia refractories are (a) Magnesite ($MgCO_3$), spathic, i.e., coarsely crystalline magnesite, or compact, crypto-crystalline magnesite; (b) Brucite ($Mg(OH)_2$); (c) Sea-water magnesia; and (d) Breunnerite or other such solid solutions. The raw materials are dead-burned before final fabrication into the form of a refractory. By "dead-burned" is meant a raw material that has been calcined at such a temperature as to enable it to be used in brick-making and service without undue difficulty due to hydration or shrinkage. Whether the material is made from the carbonate or the hydroxide the same general considerations apply. Conventionally the dead-burning is carried out either in a shaft (periodic) or a rotary kiln and in the temperature range 1,650°–1,750° C.

Subsequent to dead-burning, the materials are ground and graded (fractioned into sizes). The grading is especially important as it controls to some extent the porosity of the shaped unfired brick. In general the final mix is composed of coarse, medium and fine clinkers (i.e., dead-burned raw materials).

Material for magnesia bricks is usually prepared by mixing the graded clinker with water or an organic binder such as molasses, sulphite lye etc. For special basic refractories, other oxides such as alumina, chrome ore etc. are added to improve the quality of the product. The material is shaped in a hydraulic, mechanical or hammer-type press to produce bricks of an unfired density of about 70 percent of theoretical, i.e., 30 percent porosity. The bricks are dried either in a tunnel kiln, or in a drying chamber, and are then fired in the temperature range 1,550°–1,700° C. (for 1 to 7 days, varying inversely with temperature) to obtain a strong and dense body having a density of about 80 percent of theoretical. Commercial basic refractories for steel plant use of higher than about 85 percent density (i.e., less than 15 percent porosity) are not presently obtainable. The economics of the conventional process does not permit producing higher density refractories, as this would entail a much higher firing temperature and longer period of heating.

The improvement according to the present invention is a method for preparing shaped and densified magnesia-base refractories comprising: (a) providing a particulate charge part of which is magnesium oxide by one of (i) partially calcining magnesium carbonate or magnesium hydroxide, (ii) calcining magnesium carbonate or hydroxide, cooling and partially hydrating (or rehydrating) to hydroxide at least on the particle surface, and (ii) mixing magnesium carbonate or hydroxide with the product of (ii) or with sinterable magnesia or mixtures thereof; (b) heating the charge and reactive hot-pressing while decomposition of hydroxide or carbonate is occurring, and (c) stabilizing the shaped densified charge at sintering temperature for less than the sintering time required in the absence of such hot-pressing.

The invention in this specification involves no dead-burning, a low temperature (partial) calcining step, only a short, low temperature hot-pressing treatment, and a relatively short heat-stabilization step, with the resulting products having a density of up to 98 percent (i.e., 2 percent porosity). The products have a very uniform texture, close dimensional tolerance and improved properties including greater strength, and higher melting temperature (refractoriness) than the conventional. The process variables can be controlled to produce some variation in density (i.e., porosity), strength, refractoriness, and thermal conductivity as required.

The raw materials have to include a compound decomposible to oxide, as described in my U.S. Pat. No. 3,379,523 dated Apr. 23, 1968 such as magnesium hydroxide and magnesium carbonate including precipitated basic magnesium carbonate. It has been observed that the finer the particle size of the raw material the better the hot-pressed density. Natural brucite [$Mg(OH)_2$] may be ground to a very fine particle size, e.g., below 200 mesh and preferably below 325 mesh, to get the best results during calcining, rehydration or hot-pressing. However coarse natural brucite can be calcined at, e.g., 400°–700° C. and rehydrated to obtain a very fine particle size partially rehydrated magnesia. The decomposition-rehydration effects a rupture of the coarse particles with the result that a good particle size distribution for reactive hot-pressing is automatically obtained. Rehydration at least of the surface of the calcined particles is necessary for proper densification of such magnesia by hot-pressing during the dehydroxylation reaction. Similarly synthetic magnesium hydroxide and basic carbonate can be used to prepare the charge for the process.

The calcination is carried out at temperatures effecting decomposition but well below the usual high temperature calcination or dead-burning range. This low temperature calcination need not be complete but should remove the bulk of the volatiles and effect at least 50 percent conversion to oxide. Alternatively, the raw materials can be completely calcined and rehydrated. The rehydration should not be complete but at least the surface of the resulting particles should be hydrated to hydroxide. The rehydration is effected by cooling below the dehydroxylation temperature and exposing to water or water vapor. The hydration may result in particle fracture giving rise to smaller sizes. At least surface hydration is necessary and this is equivalent to about 25 percent wt. of the calcined material being in hydroxide form. When the charge is above about 50 percent wt. hydroxide the volatiles to be removed on reactive hot-pressing large objects become excessive. However in some cases up to about 80 percent wt. of charge can be as hydroxide (or carbonate) — see Example 8. Thus about 5–80 percent wt. of the Mg compounds in the charge can be the hydroxide or carbonate, but it is preferred to use about 10–50 percent, desirably as the hydroxide.

The powdered calcined-and-rehydrated or partially calcined raw material is then hot-pressed at or above the decomposition (dehydroxylation) temperature. The temperature of the reactive hot-pressing should be sufficient (but preferably only sufficient) to effect complete decomposition to oxide. The hot-pressing should be carried out in such a way that the pressure is applied at least while dehydroxylation is occuring. As a large volume of vapor phase is generated during the dehydroxylation stage, for a large body to be fabricated, partially calcined or calcined and partially rehydrated raw materials have an economic advantage over the fully hydrated natural and synthetic magnesium hydroxide. Calcination of magnesium hydroxide and magnesium carbonate and subsequent controlled rehydration can be used to adjust the amount of vapor phase generated during the hot-pressing step. The calcination of magnesium carbonate and subsequent partial rehydration also reduces the hot-pressing temperature as dehydroxylation takes place at least 200° C. lower than the decarbonation. The hydrated materials can be preheated to a temperature slightly lower than the temperature needed for the dehydroxylation. This can be done in a batch operation or continuously, e.g., in a rotary kiln. However, the preheating stage must not remove the rehydration water from the material, as otherwise this will be equivalent to a complete calcination. The complete precalcination before hot-pressing means there can be no decomposition and breaking of chemical bonds during the low temperature hot-pressing, and the densification and strengthening possible is greatly reduced.

The hydrated materials should be hot-pressed within the temperature range of about 400°–700° C. It is not necessary to heat above about 500°–600° C. unless uncalcined carbonate is present which should be hot-pressed and decomposed at about 700°–800° C. This step will produce a bulk density of about 60–95 percent of the theoretical density depending on temperature, pressure, time and particle size. This hot-pressing step will also produce the final shape of the product, such as bricks or other shapes used in the refractory industry. The pressure to be applied may be hydraulic or mechanical and desirably in the range of about 5,000–25,000 psi, although somewhat lower or higher pressures may be useful in particular circumstances. The pressure should be adequate to take advantage of the molecular disruption occurring on decomposition, i.e., effect the desired densification at the hot-pressing stage. The optimum pressure will vary depending on the charge size and configuration, composition, particle size etc. as will the optimum temperature.

The die can be left at the temperature at which the hot-pressing would be carried out. The preheated material (preheated to a temperature lower than the decomposition temperature) is then poured into the hot die and hot-pressing is carried out for about 1 to 10 minutes depending upon the size of the final product and the amount of volatiles to be removed.

The hot-pressed product having the density 60–95 percent (i.e. 40 to 5 percent porosity) of the theoretical should be given a brief final heat treatment at or over about 1,500° C. for stabilization (and further densification if desired). This final heat treatment or sintering can be done in any conventional sintering kiln in use commercially now-a-days where the temperature can be desirably within about 1,500° C. to about 1,750° C. The time of this second heat treatment is not critical and may vary for example from about 10 minutes to about 5 hours depending upon the temperature and nature of the product to be produced. These times are significantly less than required in the absence of the hot-pressing described above.

This latter heat treatment may alternatively be carried out under pressure in the same apparatus used for hot-pressing or in other apparatus. However the use of pressure above the hot-pressing (decomposition) temperatures is not essential to obtaining high density and is usually not preferred for economic reasons. Further densification will take place during the stabilization even without pressure being applied, with final densities of 90–98 percent of theoretical being attained.

The invention will be more fully understood from the Examples which follow, which are intended to illustrate the advantages of the invention and are not intended to limit the same.

EXAMPLES WITH PARTIALLY CALCINED MAGNESIUM HYDROXIDE (1–5)

EXAMPLE 1

A synthetic magnesium hydroxide was first partially calcined at 350° C. for 10 min., when 15 percent (of the possible 30 percent by wt.) weight loss occurred. The partially calcined material was partially cooled in a moist atmosphere during transfer to the die with some surface rehydration occurring. The pressure was applied immediately after pouring into the die. The material was reactive hot-pressed under 15,000 psi at 600° C. for 5 min. The pressure was maintained at 15,000 psi during heating from about 300° to 600° C. At this stage dehydroxylation of the remaining hydroxide in the system occurred. The resultant hot-pressed density was 80 percent. This hot-pressed product was then fired at 1,550° C. for 1 hour. The final sintered density was 96 percent of the theoretical (i.e. only 4 percent porosity).

EXAMPLE 2

A synthetic magnesium hydroxide was calcined at 400° C. for 10 min. This produced about 70 percent dehydroxylation i.e., weight loss of 20 percent of the possible 30 percent). On cooling and transfer to the die in a moist atmosphere some surface rehydration occurred. This material was then hot-pressed under 15,000 psi at 600° C. for 10 min., which produced about 85 percent of the theoretical density (3.0 gm/cc). The hot-pressed product was then sintered at 1,550° C. for 30 min. which produced 95 percent of the theoretical density (3.40 gm/cc).

EXAMPLE 3

A synthetic magnesium hydroxide was calcined at 450° C. for 5 min. This produced a dehydroxylation of 85 percent (i.e., 25 percent weight loss of the possible 30 percent). This material was cooled in a moist atmosphere and then pressed under 15,000 psi at 600° C. for 5 min. which produced a bulk density of 87 percent (i.e., 13 percent porosity). The pressure was applied at 300° C. and maintained during heating to 600° C. The hot-pressed product was then sintered at 1550°C for 1 hour which produced the final density between 95–98 percent of the theoretical (i.e., 5–2 percent porosity).

EXAMPLE 4

A synthetic magnesium hydroxide was partially calcined at 500° C. for 5 to 10 minutes. This calcination produced about 50 to 80 percent of MgO, the remaining being $Mg(OH)_2$. This mixture was hot-pressed at 600° C. for 10 minutes, with the resultant hot-pressed density of 70–80 percent of the theoretical. The hot-pressed products were sintered at 1,550° C. for 1 hour. The final density of the sintered products was in the range 92–98 percent of the theoretical.

EXAMPLE 5

A partially calcined magnesium hydroxide as described in EXAMPLE 4, was hot-pressed at 600° C. for 1 minute, with the resultant hot-pressed density of about 60–65 percent of the theoretical. The hot-pressed specimens were sintered at 1,650° C. for 1 hour. The final density of the sintered product was 90–96 percent of the theoretical.

NOTE: The greater the dehydroxylation within about 50 to 95 percent dehydroxylation during calcination, the higher the hot-pressed density (in desirably short hot-pressing times). This is understandable since it has been observed that for large shapes, the heat transfer from the die took so long a time that the dehydroxylation was not complete in the center during the reactive hot-pressing stage. This trapped a significant amount of moisture inside the product, thus the resultant density was lower. However, there must be enough hydroxide throughout (at least 5 percent) to obtain the benefits of reactive hot-pressing.

EXAMPLES WITH MIXTURES OF CALCINED AND UNCALCINED $Mg(OH)_2$ (Ex. 6–8)

In this case, a magnesium hydroxide (sea water) was calcined between 600°–700° C. for 10–30 min. The calcined material was cooled to room temperature and exposed to moist air. During this storage, the calcined powder gained weight by 2–5 percent absorbing moisture and $CO_2$ from the air. The stored calcined and rehydrated material was mixed with uncalcined magnesium hydroxide at room temperature in the proportion of 75, 50 and 25 percent by wt. (of the calcined material). In the following EXAMPLES MgO* refers to magnesium hydroxide calcined and partially rehydrated by exposure to a moist atmosphere.

EXAMPLE 6

A mixture of MgO* and Mg(OH)$_2$ in the weight ratio of 75 to 25 was hot-pressed at a maximum temperature of 600° C. for 5 minutes under 15,000 psi. The pressure was applied at 250° C. during the heating-up period. The bulk density of the hot-pressed product was 85 percent of the theoretical density (i.e. 15 percent porosity). The hot-pressed product was then fired at 1,500° C. for 5 hours. This produced the final density of 95 percent of the theoretical.

EXAMPLE 7

Mixtures of MgO* and magnesium hydroxide in the weight ratio 50 to 50 were hot-pressed at 600° C. between 3 to 10 min. under 15,000 psi. The pressure was applied at 250° C. during heating-up. The bulk density of the hot-pressed products varied between 78–88 percent of theoretical (i.e., 22 to 12 percent porosity). The final firing was carried out at 1,550° C. for 1 hour. The final density varied between 92–98 percent of the theoretical.

EXAMPLE 8

Mixtures of MgO* and magnesium hydroxide in the weight ratio 25 to 75 were hot-pressed in the temperature range 500°–600° C. for 10 min. under 10,000–15,000 psi. The pressure was applied at 250° C. so that the complete dehydroxylation occurred under pressure. The bulk density of the hot-pressed products varied between 75–85 percent. The hot-pressed materials were sintered at 1,500°–1,600° C. for from 30 min. to 5 hours. The final densities achieved were in the range 88–98 percent of theoretical.

EXAMPLE 9

A synthetic magnesium hydroxide was calcined at 500° C. for 15 min. The calcined material was cooled and exposed to moist air over different periods varying from 1 hour to 24 hours. During this period highly reactive magnesia was rehydrated to different extents. On subsequent hot-pressing at 600° C. for 10 min. under 15,000 psi, products of 75–90 percent of theoretical density were obtained. The hot-pressed density varied directly with the extent of rehydration. These hot-pressed materials were sintered at 1,550° C. for 1 hour, which yield bulk densities of 92–98 percent of the theoretical.

EXAMPLE 10

A sea-water magnesite (Mg(OH)$_2$) was first calcined at 500° C. for 10 min. and then cooled and rehydrated by exposing to moist air and/or steam. This partially rehydrated material was hot-pressed to 500° C. for 10 min. The pressure of 15,000 psi was applied at room temperature. The hot-pressed specimens were sintered at 1,550° C. for 1 hour. This produced final densities between 92–98 percent of the theoretical.

EXAMPLE 11

A natural magnesite (MgCO$_3$) was ground to pass 325 mesh. This powder was calcined at 800° C. for 5 min. and poured while hot into cold water and left in water for 12–24 hours. This rehydrated material was hot-pressed at 600° C. for 10 min. The pressure (10,000–20,000 psi) was applied at room temperature and retained during heating to the hot-pressing temperature. The pressed pellets were subsequently sintered at 1,550° C. for 1 hour. The final density was in the range 92–98 percent of the theoretical (i.e., 2–8 percent porosity).

The hydroxide, carbonate, partially calcined, or rehydrated material may be mixed or extended with sinterable magnesia particles — desirably in a size range known to have good sintering properties — before reactive hot-pressing. Up to about 50 percent wt. of the charge may be comprised of such magnesia particles (above this amount the densification and strengthening attainable during the low temperature hot-pressing is usually unsatisfactory). For example it may be desirable to have a low temperature calcination line effecting calcination to oxide — with some or all of the oxide being held at close to or just below decomposition temperature — and preparing the charge by mixing this hot oxide with the hydroxide or carbonate (e.g., to effect a preheating).

While magnesia should be in major proportion in the product, other fillers may be added in minor amount to the starting material, e.g., to form cermets and filled or reinforced refractories for particular applications. Suitable particulate additives include Cr$_2$O$_3$, graphite, alumina, iron, copper and chromium.

The products of the EXAMPLES were of higher density, required less heat and took less time to produce, than prior products produced as described on page 2. Die design is simplified, large article product density generally improved, and hot-pressing time to a given density reduced, compared to hot-pressing the hydroxide or carbonate per se.

I claim:

1. A method for preparing shaped high density magnesia refractories comprising:
   a. preparing a composite particulate charge comprising in part (1) magnesium oxide derived from calcining a source material selected from the group consisting of magnesium hydroxide and magnesium carbonate and mixtures thereof, and in part (2) material selected from the group consisting of magnesium hydroxide, magnesium carbonate, and magnesium hydroxide from the partial hydration of magnesium oxide from (1);
   b. heating the charge to decomposition temperature and reactive hot-pressing while decomposition of said hydroxide or said carbonate is occurring; and
   c. stabilizing the shaped densified charge at sintering temperature for between about 10 minutes and 5 hours which is substantially less than the time required in the absence of such use of a composite particulate charge.

2. The method of claim 1 wherein partially calcined magnesium hydroxide is hot-pressed at about 400°–700° C.

3. The method of claim 1 wherein partially calcined magnesium carbonate is hot-pressed at about 700°–800° C.

4. The method of claim 1 wherein a magnesium compound selected from the group consisting of magnesium hydroxide, magnesium carbonate and mixtures thereof is calcined, cooled, partially hydrated to hydroxide and hot-pressed at about 400°–700° C.

5. The method of claim 1 wherein magnesium hydroxide is mixed with calcined partially hydrated material and the mixture hot-pressed at about 400°–700° C.

6. The method of claim 1 wherein magnesium hydroxide is mixed with a low temperature calcined magnesia and the mixture hot-pressed at about 400°–700° C.

7. The method of claim 6 wherein said magnesia is still hot from calcination.

8. The method of claim 1 wherein about 5–80 percent wt. of the magnesium compounds in the charge is the hydroxide or carbonate.

9. The method of claim 1 wherein magnesium hydroxide in about 10–50 percent wt. of the magnesium compounds in the charge is the compound decomposed on hot-pressing.

10. The method of claim 1 wherein the hot-pressing is carried out at about 5,000–25,000 psi for up to about 10 minutes.

11. The method of claim 1 wherein the heat stabilization is carried out at about 1,500°–1,750° C.

12. The method of claim 1 wherein the heat stabilization is carried out for a time within about 10 minutes to 5 hours.

13. The method of claim 1 wherein the charge is preheated to below decomposition temperature and then introduced into the die which is at hot-pressing temperature.

14. The method of claim 1 wherein low temperature calcination of magnesium hydroxide is carried out within about 400°–700° C.

15. The method of claim 1 wherein said composite particulate charge includes at least one additive selected from the group consisting of reinforcing fillers and cermet-forming metals.

* * * * *